United States Patent
Ding et al.

(10) Patent No.: US 12,266,867 B2
(45) Date of Patent: Apr. 1, 2025

(54) MITIGATING BEAM SQUINT IN MULTI-BEAM FORMING NETWORKS

(71) Applicant: Galtronics USA, Inc., Tempe, AZ (US)

(72) Inventors: Kejia Ding, Tempe, AZ (US); Sadegh Farzaneh, Tempe, AZ (US); Minya Gavrilovic, Tempe, AZ (US)

(73) Assignee: Galtronics USA, Inc., Tempe, AZ (US)

( * ) Notice: Subject to any disclaimer, the term of this patent is extended or adjusted under 35 U.S.C. 154(b) by 430 days.

(21) Appl. No.: 17/769,625

(22) PCT Filed: May 29, 2020

(86) PCT No.: PCT/US2020/035186
§ 371 (c)(1),
(2) Date: Apr. 15, 2022

(87) PCT Pub. No.: WO2021/076195
PCT Pub. Date: Apr. 22, 2021

(65) Prior Publication Data
US 2023/0307832 A1    Sep. 28, 2023

Related U.S. Application Data

(60) Provisional application No. 62/923,352, filed on Oct. 18, 2019.

(51) Int. Cl.
*H01Q 3/40* (2006.01)
*H01Q 25/00* (2006.01)

(52) U.S. Cl.
CPC ............... *H01Q 3/40* (2013.01); *H01Q 25/00* (2013.01)

(58) Field of Classification Search
CPC ........ H01Q 3/40; H01Q 25/00; H04B 7/0617; H04B 1/18
See application file for complete search history.

(56) References Cited

U.S. PATENT DOCUMENTS

| 4,673,942 A * | 6/1987 | Yokoyama ............. H01Q 25/00 342/368 |
| 6,252,542 B1 | 6/2001 | Sikini et al. |
| 2010/0259446 A1 | 10/2010 | Corman et al. |
| 2012/0299775 A1 | 11/2012 | Corman et al. |

(Continued)

OTHER PUBLICATIONS

International Search Report issued for International Patent Application No. PCT/US 20/35186, dated Aug. 28, 2020.

(Continued)

*Primary Examiner* — Dieu Hien T Duong
(74) *Attorney, Agent, or Firm* — Bradley Arant Boult Cummings LLP; Henry B. Ward, III

(57) ABSTRACT

Systems and methods relating to multi-beam forming networks using an antenna array. A matrix circuit for feeding elements of an antenna array to produce multiple beams is provided. To address beam squint issues, beam squint is mitigated by using a series of phase shifters with specific phase-delay performances between the matrix circuit and the antenna array elements. A linearly increasing or decreasing phase difference in the signals fed into adjacent antenna array elements across the array mitigates or eliminates beam squint in the resulting multiple beams. The phase shifters are programmed to provide this increasing or decreasing phase differences.

6 Claims, 15 Drawing Sheets

(56) References Cited

U.S. PATENT DOCUMENTS

2015/0244072 A1    8/2015   Harel
2017/0331528 A1    11/2017   Gamand et al.

OTHER PUBLICATIONS

Written Opinion issued for International Patent Application No. PCT/US 20/35186, dated Aug. 28, 2020.
Ding, Kejia et al: "2-D Butler Matrix and Phase-Shifter Group", IEEE Transaction on Microwave Theory and Techniques, IEEE, USA, vol. 66, No. 12, Dec. 1, 2018, pp. 5554-5562, XP011699791, ISSN: 0018-9480, DOT: 10.1109/TMTT.2018.2879013.
Roeloffzen. Chris et al: "Enhanced coverage though optical beamforming in fiber wireless networks", 2017 19th International Conference on Transparent Optical Networks (ICTON), IEEE, Jul. 2, 2017, pp. 1-4, XP033147958, DOI: 10.1109/ICTON.2017.8025129.
Extended European Search Report issued by the European Patent Office for European Patent Application No. 20876329.2, dated Oct. 30, 2023.

\* cited by examiner

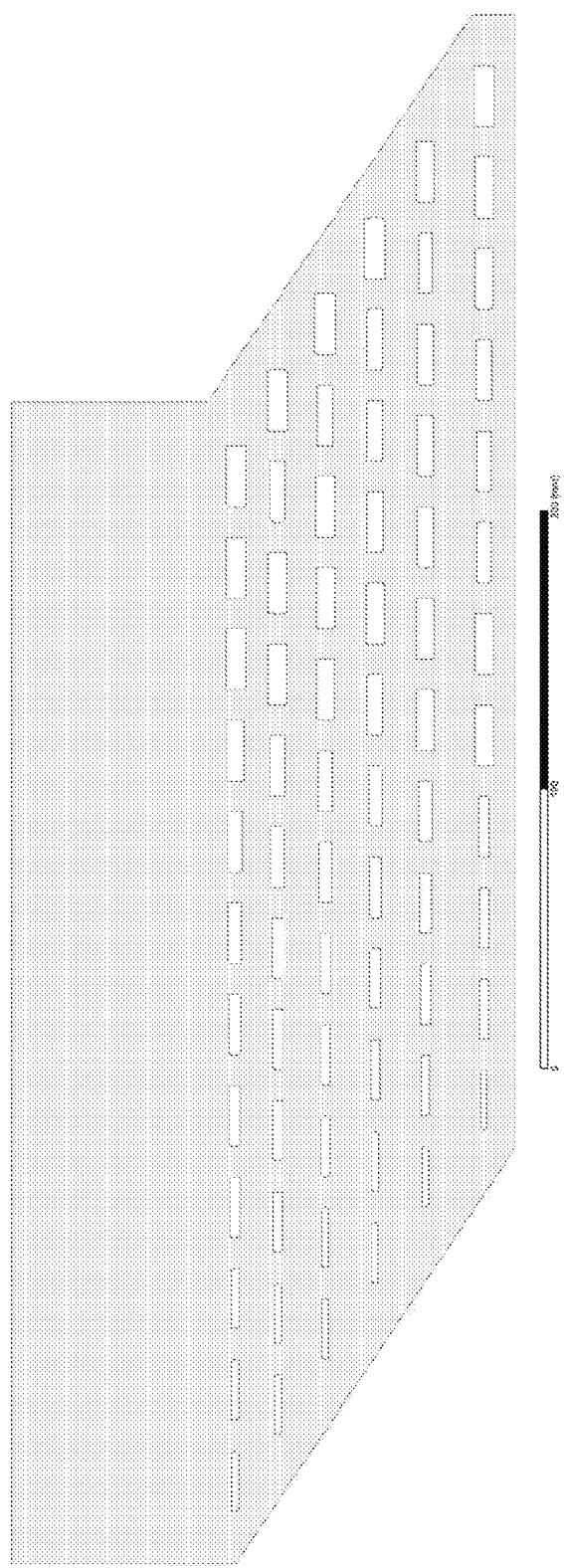

MITIGATING BEAM SQUINT IN MULTI-BEAM FORMING NETWORKS

RELATED APPLICATIONS

This application claims the benefit of U.S. Provisional Patent Application No. 62/923,352 filed on Oct. 18, 2019, which is hereby incorporated by reference in its entirety.

TECHNICAL FIELD

The present invention relates to antenna related circuitry. More specifically, the present invention relates to circuitry for use in reducing beam squint in multi-beam forming networks.

BACKGROUND

To increase the communication capacity of base stations, multi-beam base station antenna arrays are required to divide the coverage of the base station from an entire area into several smaller cells. As well, it is expected to keep each beam's coverage to be the same within the whole operating frequency band.

This beam coverage can become an issue especially with multi-beam antenna arrays.

Multi-beam antenna arrays can be divided into two categories: multi-beam antennas that are built based on the principle of lens and multi-beam antennas that are formed from ordinary antenna arrays that are fed by multi-beam forming networks (MBFNs).

For lens based antennas, the multiple beams can be generated by multiple feeds located on different positions, such as Luneburg lens antenna, the positions can be calculated using the principle of lens or paraboloid focuses, etc. Such multi-beam antennas generally have satisfying performances at wideband matching and beam isolation. As well, such antennas, theoretically, do not have the problem of beam squint.

The main problem of such lens based antennas is, simply, the size of the antennas. Such antennas require a relatively large volume lens/reflectors that are heavy, expensive, and difficult/tricky to manufacture. The large size of the lens/reflector stems from the requirement that the dimension of the lens must be greater than multiple electrical wavelengths. It is theoretically difficult to reduce the size of such reflectors, especially for lower frequencies such as 1 GHz-3 GHz.

For antennas that fed/generated by multi-beam forming networks (MBFNs), there are two sub-types of MBFNs. The first sub-type is based on the principle lens, such as a Rotman lens. Due to the similarity of the principles at work, this sub-type of MBFNs has the same advantages and drawbacks as the lens based multibeam antennas, i.e., these provide satisfying performances but are physically quite large in size.

The second sub-type of MBFNs is built usually based on directional couplers, phase shifters, and crossovers. The features of the components only depend on the electrical lengths of the transmission lines to build the components. Since the components can be implemented using planar circuits and since the sizes of the components can be reduced by using meander lines or high-dielectric laminates, the volume of the networks is generally much smaller than the lens based multibeam antennas. However, almost all antenna systems, including those that use Butler matrices, Blass matrices, Nolen matrices, et. al., that are generated by MBFNs have the problem of beam squint.

Most multi-beam antenna arrays based on multi-beam-forming networks have the problem that the beam direction will scan undesirably but inevitably with frequency changing. As the frequency changes, the beam direction will change and yet the beam is expected or desired to point in the same direction. This is especially problematic where, for some communication systems such as 3G, 4G, and 5G mobile communications, up-link and down-link are operated at different frequency bands. Due to this changing of beam directions (known as beam squint), the areas of beam coverage will be different at various frequencies, and therefore, the antenna array cannot achieve the closed-loop communication. This problem is exacerbated as the fractional bandwidth increases, for example, wider than 30% bandwidth.

There is therefore a need for methods and systems that address the issue of beam squint in such MBFN generated antenna systems.

SUMMARY

The present invention provides systems and methods relating to multi-beam forming networks using an antenna array. A matrix circuit for feeding elements of an antenna array to produce multiple beams is provided. To address beam squint issues, beam squint is mitigated by using a series of phase shifters with specific phase-delay performances between the matrix circuit and the antenna array elements. A linearly increasing or decreasing phase difference in the signals fed into adjacent antenna array elements across the array mitigates or eliminates beam squint in the resulting multiple beams. The phase shifters are programmed to provide this increasing or decreasing phase differences.

In a first aspect, the present invention provides a circuit for use in simultaneously generating multiple beams using an antenna array having multiple antenna array elements, the circuit comprising:

a matrix circuit comprising a plurality of hybrid couplers and delay lines, said matrix circuit being coupled between a plurality of loads and said antenna array;

a plurality of phase shifters coupled between said matrix circuit and said antenna array;

wherein each row of said matrix circuit comprises a plurality of hybrid couplers coupled in series row-wise, with each row-wise pair of hybrid couplers being joined by at least one delay line;

each column of said matrix circuit comprises a plurality of hybrid couplers coupled in series column-wise;

a top row of said matrix circuit is coupled to antenna elements of said antenna array such that each hybrid coupler of said top row is coupled to an antenna element of said antenna array by way of a phase shifter of said plurality of phase shifters, each hybrid coupler of said top row being coupled column-wise between a phase shifter of said plurality of phase shifters and a hybrid coupler of a preceding row of said matrix circuit;

a bottom row of said matrix circuit is coupled to a plurality of matching loads such that each hybrid coupler of said bottom row is coupled column-wise between a matching load of said plurality of matching loads and a hybrid coupler of an immediately succeeding row of said matrix circuit; and said phase shifters are used to generate linearly increased phase differences between adjacent antenna array elements for signals from said matrix circuit.

In a second aspect, the present invention provides a circuit for use in simultaneously generating multiple beams using an antenna array having multiple antenna array elements, the circuit comprising:
- a matrix circuit comprising a plurality of hybrid couplers and delay lines, said matrix circuit being coupled between a plurality of loads and said antenna array;
- a first plurality of phase shifters coupled between adjacent rows of said matrix circuit;
- a second plurality of phase shifters coupled between said matrix circuit and said antenna array;

wherein
- each row of said matrix circuit comprises a plurality of hybrid couplers coupled in series row-wise, with each row-wise pair of hybrid couplers being joined by at least one delay line;
- a top row of said matrix circuit is coupled to antenna elements of said antenna array such that each hybrid coupler of said top row is coupled to an antenna element of said antenna array by way of a phase shifter of said second plurality of phase shifters, each hybrid coupler of said top row being coupled column-wise between a phase shifter of said second plurality of phase shifters and a phase shifter of said first plurality of phase shifters;
- a bottom row of said matrix circuit is coupled to a plurality of matching loads such that each hybrid coupler of said bottom row is coupled column-wise between a matching load of said plurality of matching loads and a phase shifter of said first plurality of phase shifters;
- each phase shifter of said first plurality of phase shifters is coupled between hybrid couplers of adjacent rows in said matrix circuit such that each hybrid coupler of said matrix circuit is coupled in series column-wise to at least one phase shifter of said first plurality of phase shifters; and
- said phase shifters of said first and second plurality of phase shifters are used to generate linearly increased phase differences between adjacent antenna array elements for signals from said matrix circuit.

In a third aspect, the present invention provides a circuit for use in simultaneously generating multiple beams using an antenna array having multiple antenna array elements, the circuit comprising:
- a matrix circuit comprising a plurality of hybrid couplers and delay lines, said matrix circuit being coupled between a plurality of loads and said antenna array;
- a plurality of phase shifters with each phase shifter being coupled to at least one hybrid coupler;

wherein
- each row of said matrix circuit comprises a plurality of hybrid couplers coupled in series row-wise, with each row-wise pair of hybrid couplers being joined by at least one delay line;
- a bottom row of said matrix circuit is coupled to a plurality of matching loads; and
- said phase shifters are used to generate linearly increased phase differences between adjacent antenna array elements for signals from said matrix circuit.

BRIEF DESCRIPTION OF THE DRAWINGS

The embodiments of the present invention will now be described by reference to the following figures, in which identical reference numerals in different figures indicate identical elements and in which:

FIGS. 5A-5F illustrate a 12-element, 6-beam implementation of the present invention;

DETAILED DESCRIPTION

In one aspect, the present invention provides antenna systems based on couplers and phase shifters, in terms of the composition of functional components. The resulting antenna systems are compact, light-weight, and low-cost.

In another aspect, the present invention uses circuitry that is used with antenna arrays and provides circuitry that cancels the beam squint in the resulting multiple beams. To cancel the beam squint, a linear phase delay is required for each output port of the multi-beam network connected to the antenna array elements. A progressively and successively increasing linear phase delay is required across all the output ports. A Blass matrix can be used to provide a base with acceptable performance of approximate linear phase delay. With the Blass matrix, a series of phase shifters are used and placed between the Blass matrix and the antenna array elements to offset the error and to thereby achieve the expected linear phase delays.

Figure 1:
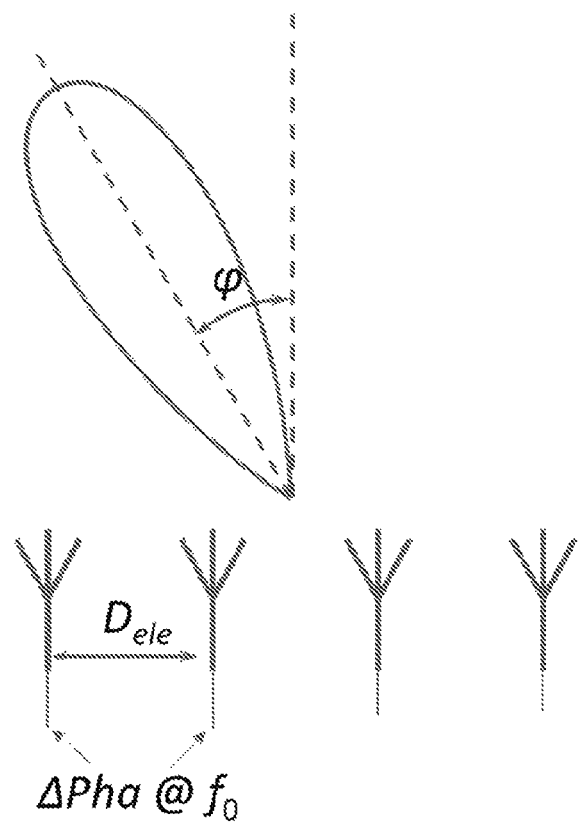
FIG. 1 schematically illustrates the concept of beam squint.

Regarding the theoretical underpinnings of the present invention, to generate a beam with a specific direction tilted φ from the normal direction at a given frequency f0, as shown in FIG. 1, the progressive phase difference, ΔPha, between adjacent elements should be (Equation 1):

$$\Delta Pha = \frac{2\pi \cdot D_{ele} \sin\varphi}{\lambda_0} \quad (1)$$

where λ0 is the wavelength in free space at frequency f0.

It can be seen that, if the beam direction, φ, is to be kept as a constant value within a particular frequency bandwidth, the phase difference has to be a linearly increasing value because of the linearly increasing λ0.

However, due to the principle of directionally coupling, almost all directional couplers, such as 3-dB 90-degree quadrature coupler, rat-race coupler, Magic-T, etc., are unable to provide the performance of linear increased (or reduced/decreased) phase differences between the coupled port and through port. Instead, the couplers will generate a constant phase difference between the coupled port and through port within a given bandwidth.

According to Equation (1), it is clear that the ΔPha is a constant value and that, when λ0 linearly increases with frequency changing/increasing, the value of φ will be accordingly tilted. This explains the presence of beam squint in MBFNs. And, since all the second sub-type MBFNs are constructed based on directional couplers, the beam squint problem is inevitable if the linear phase differences cannot be generated.

To address this beam squint issue, the required linear phase differences are generated. To generate the required linear phase differences at the ports connected to the antenna array elements, a series of phase shifters or a phase-shifter group, is placed between the antenna array and a conventional Blass matrix. This configuration is shown in FIG. 2.

Figure 2:
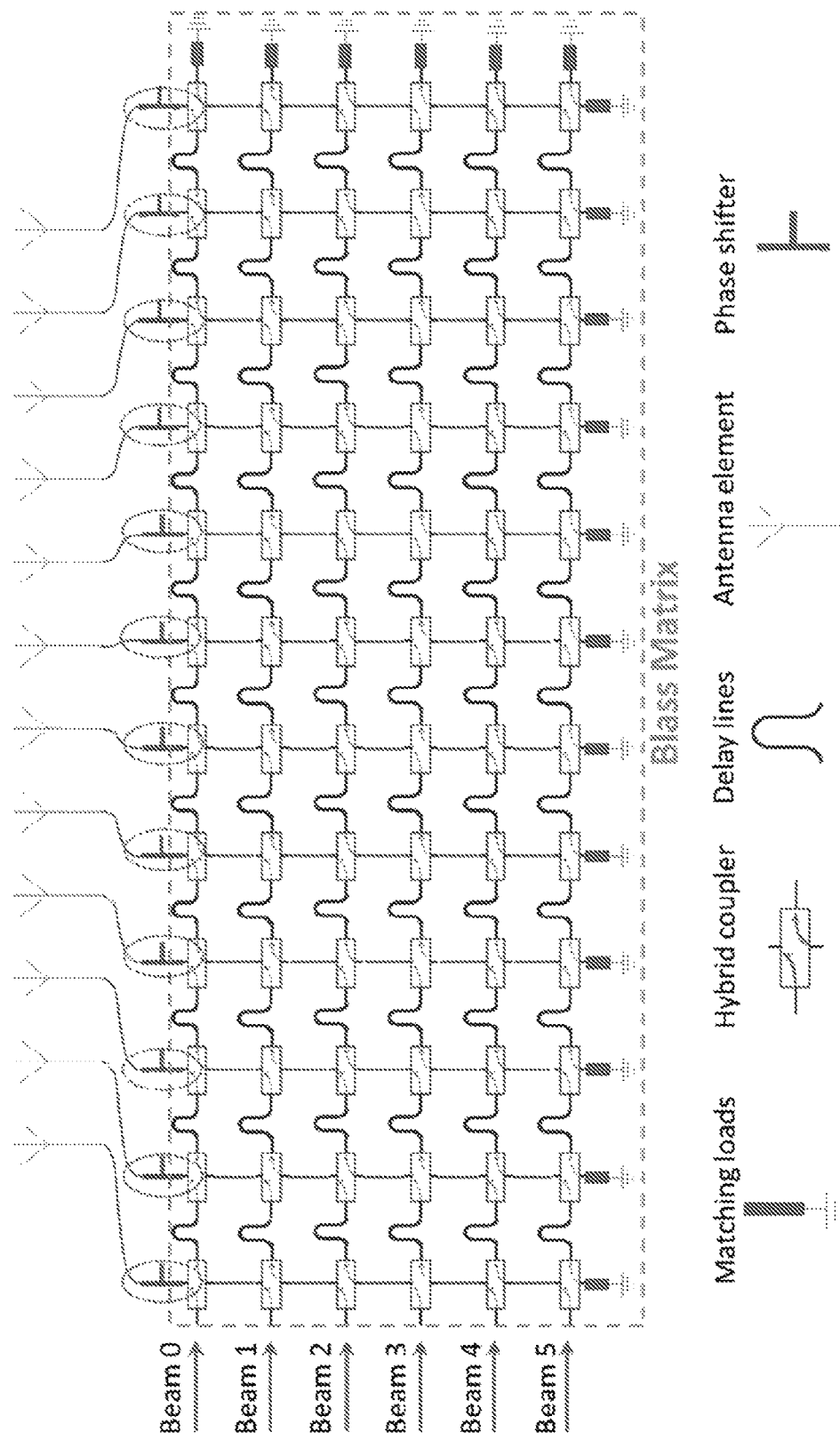
FIG. 2 schematically illustrates one aspect of the present invention.

FIG. 2 shows a conventional Blass matrix with hybrid couplers in each row being coupled in series by way of delay lines. Column-wise, each hybrid coupler in the bottom row is coupled between a matching load and a hybrid coupler in a succeeding row. Also, each hybrid coupler in the top row is coupled between a hybrid coupler in a preceding row and a phase shifter. Each phase shifter is coupled between a hybrid coupler in the top row and an antenna array element.

The schematic diagram in FIG. 2 is an example of an MBFN for a 12-element 6-beam application without beam squint. As noted above, the beam squint is cancelled using a series of phase shifters denoted in red in the Figure. These phase shifters generate the required linearly increased phase differences that cannot be generated by regular couplers. The linearly increased phase differences can be designed and configured as needed. For further details regarding such phase differences, the following reference can be consulted: K. Ding and A. A. Kishk, "2-D Butler Matrix and Phase-Shifter Group," *IEEE Trans. Microw. Theory Techn.*, vol. 66, no. 12, pp. 5554-5562, December 2018. This reference is hereby incorporated in its entirety herein by reference.

It can be seen from FIG. 2 that each row of the matrix circuit has a plurality of hybrid couplers coupled in series row-wise. Each row-wise pair of hybrid couplers is joined by at least one delay line. The top row of hybrid couplers is coupled to antenna elements of the antenna array. This is done such that each hybrid coupler of the top row is coupled to an antenna element by way of a phase shifter. In this implementation, the bottom row of the matrix circuit is coupled to matching loads such that each hybrid coupler in the bottom row is coupled column-wise between a matching load and a hybrid coupler from a succeeding row.

Figure 3:
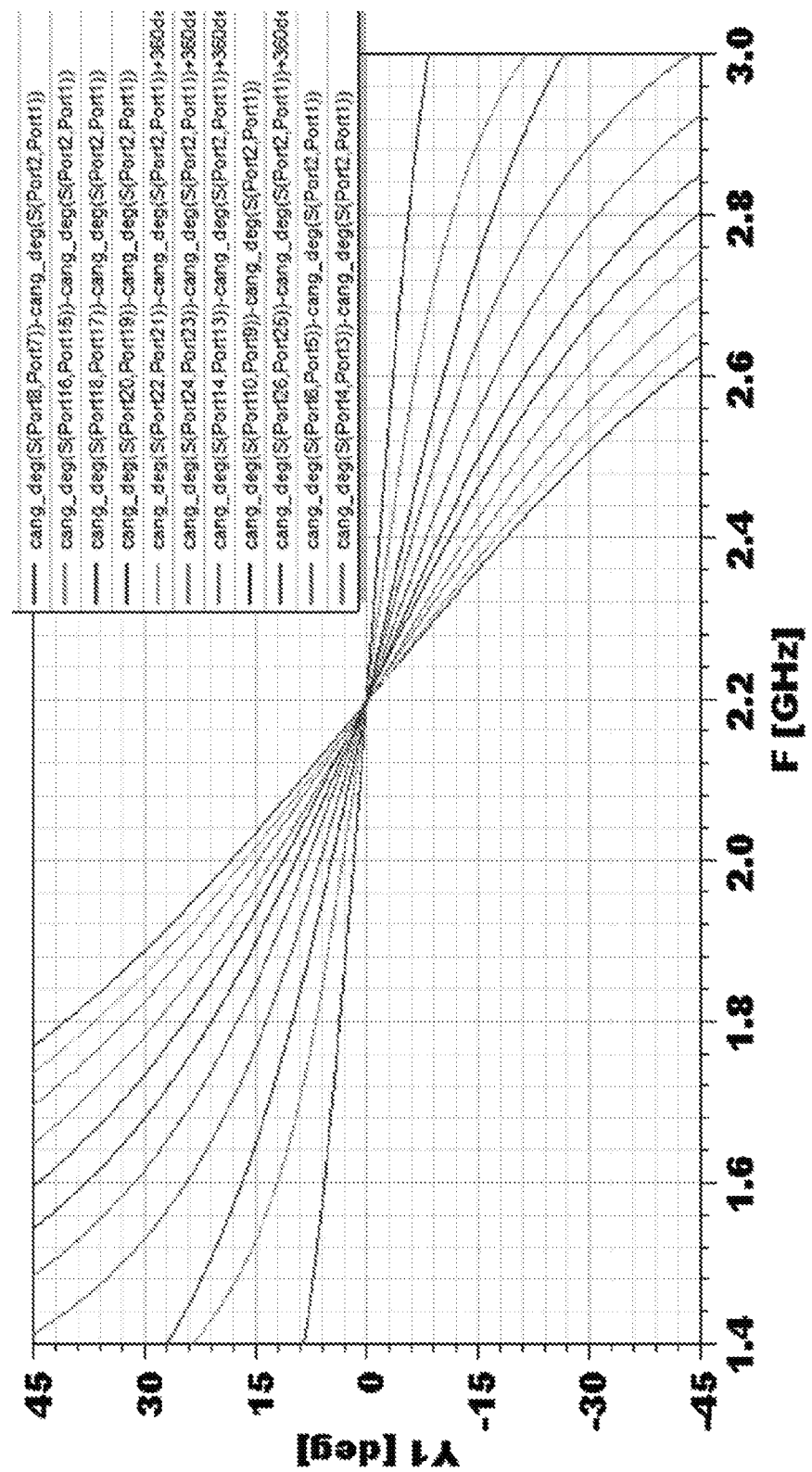
FIG. 3 shows the effect of beam squint on beam direction.

Referring to FIG. 3, this figure shows the simulated results of the phase difference on each path of the phase-shifters from FIG. 2. From FIG. 3, it can be seen that, while the 12 phase shifters have the same phase delay at the central frequency, the phase shifters have different gradients (slopes) when the frequency changes. The gradients on each path will gradually increase (or decrease) with the same difference between adjacent paths.

From FIG. 3, it can be seen that a number of points can be extracted in terms of preferable configurations. These points are that: 1. the phase delay on each path at some given frequency is preferably equal to each other; 2. the gradient of phase delay on each path is preferably coordinated with each other to cancel the beam squint; 3. the required gradients of phase delays on each path are not only related to the phase-shifter group itself, but also relevant to the Blass matrix. Thus, as a beam is swept across different frequencies, the phase delay is increased as the frequency increases.

Figure 4A:
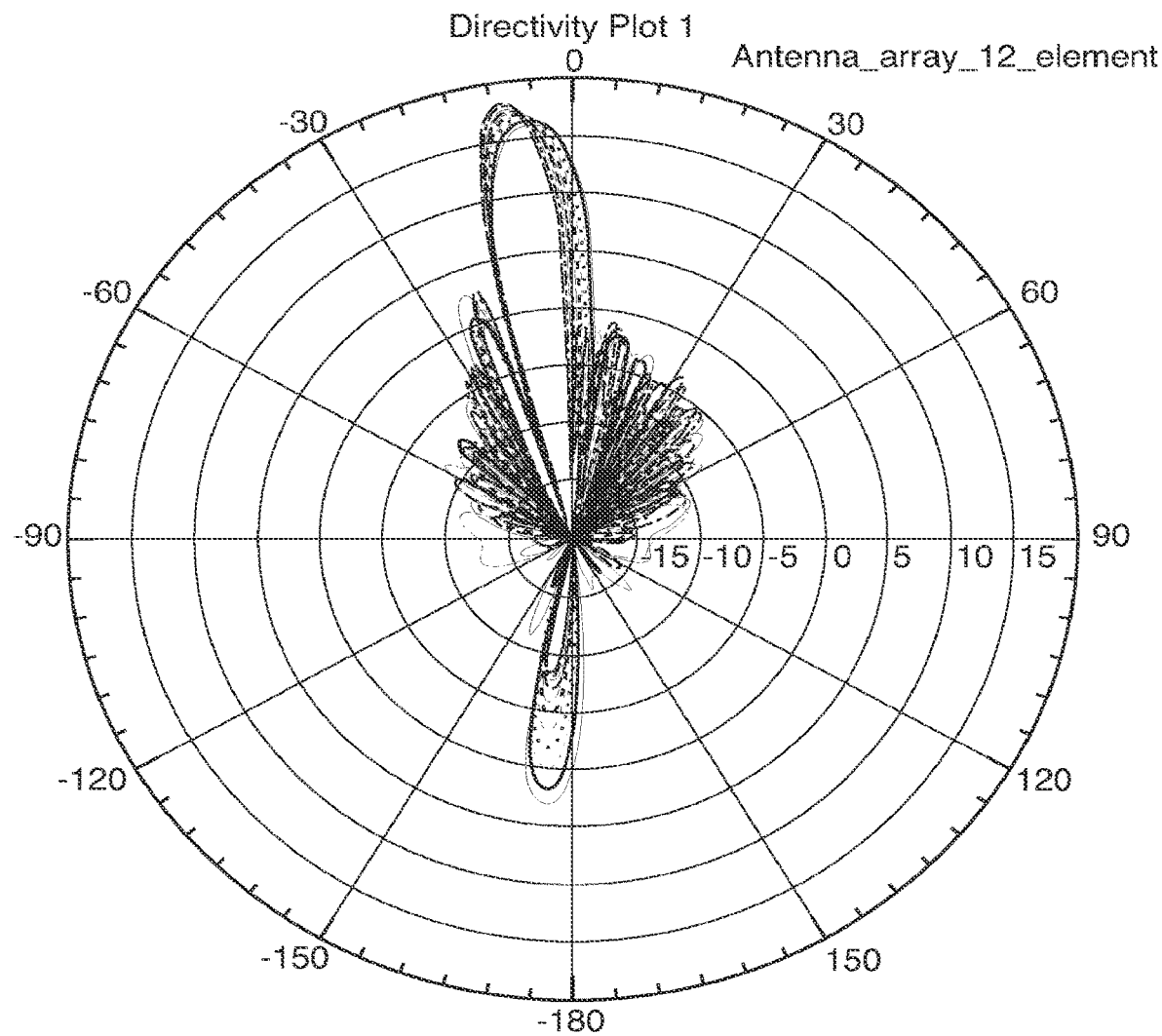
FIGS. 4A-4D show resulting beam patterns using both a conventional Blass matrices as well as one implementation of the present invention.
Figure 4B:
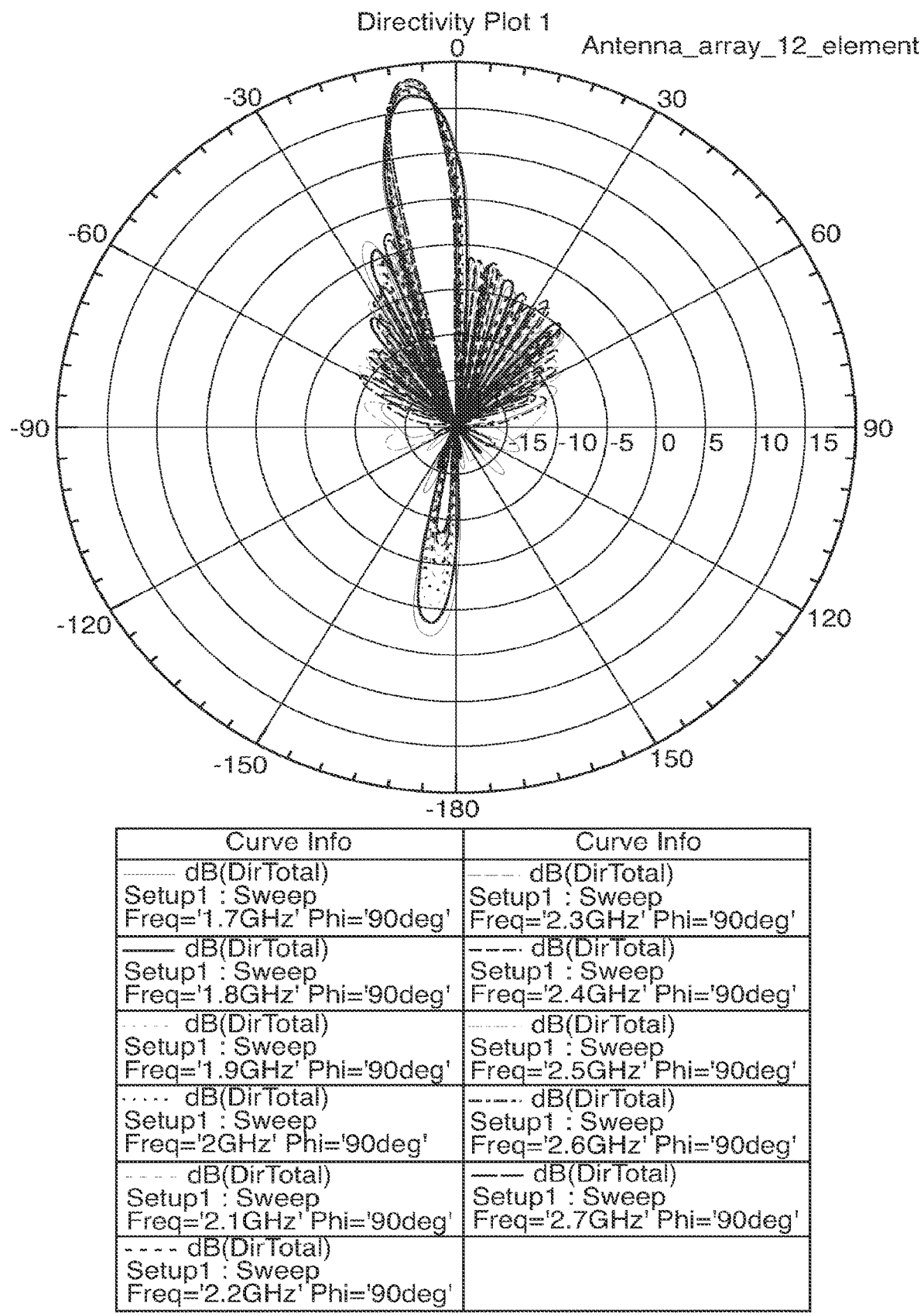
Figure 4C:
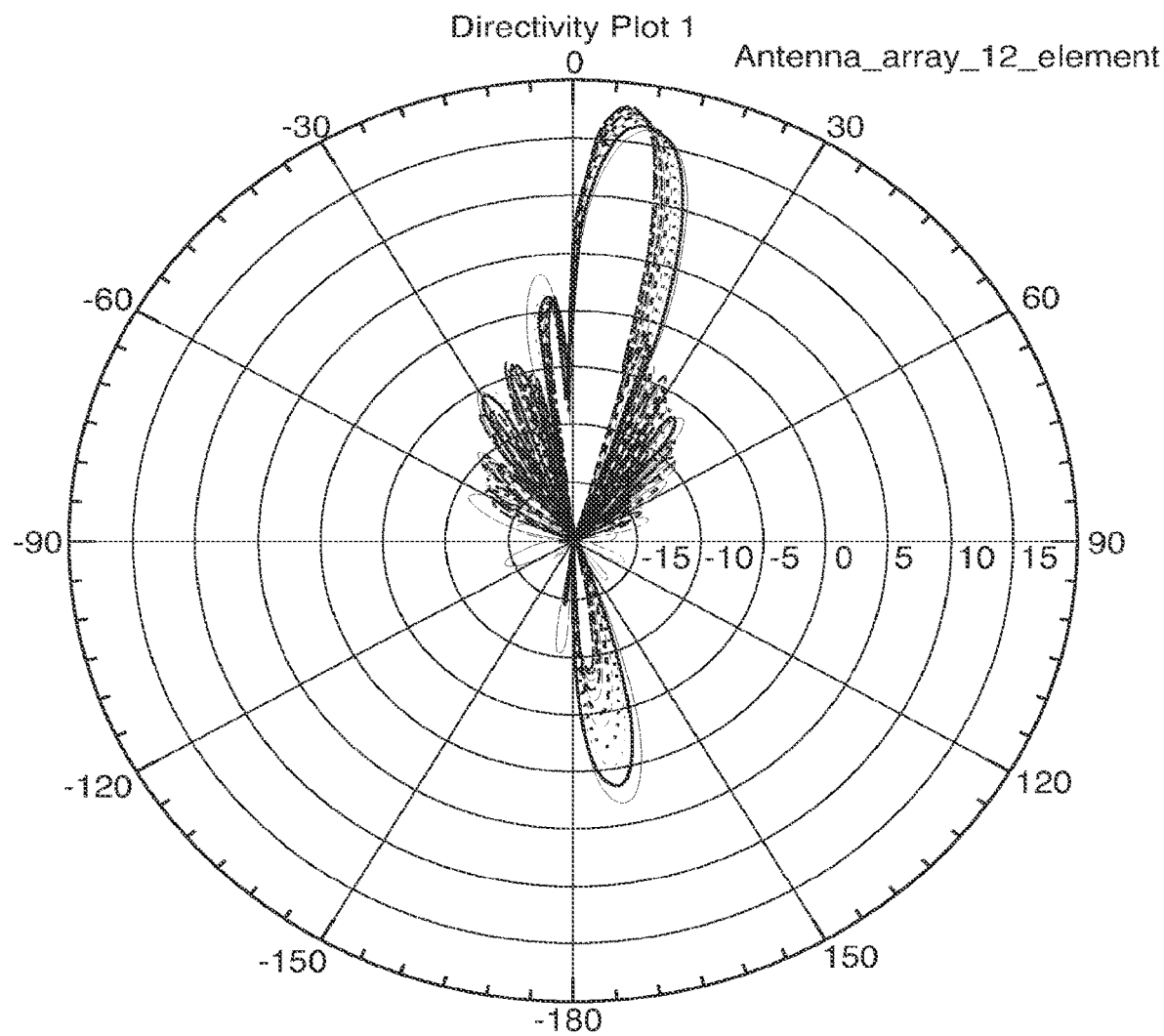
Figure 4D:
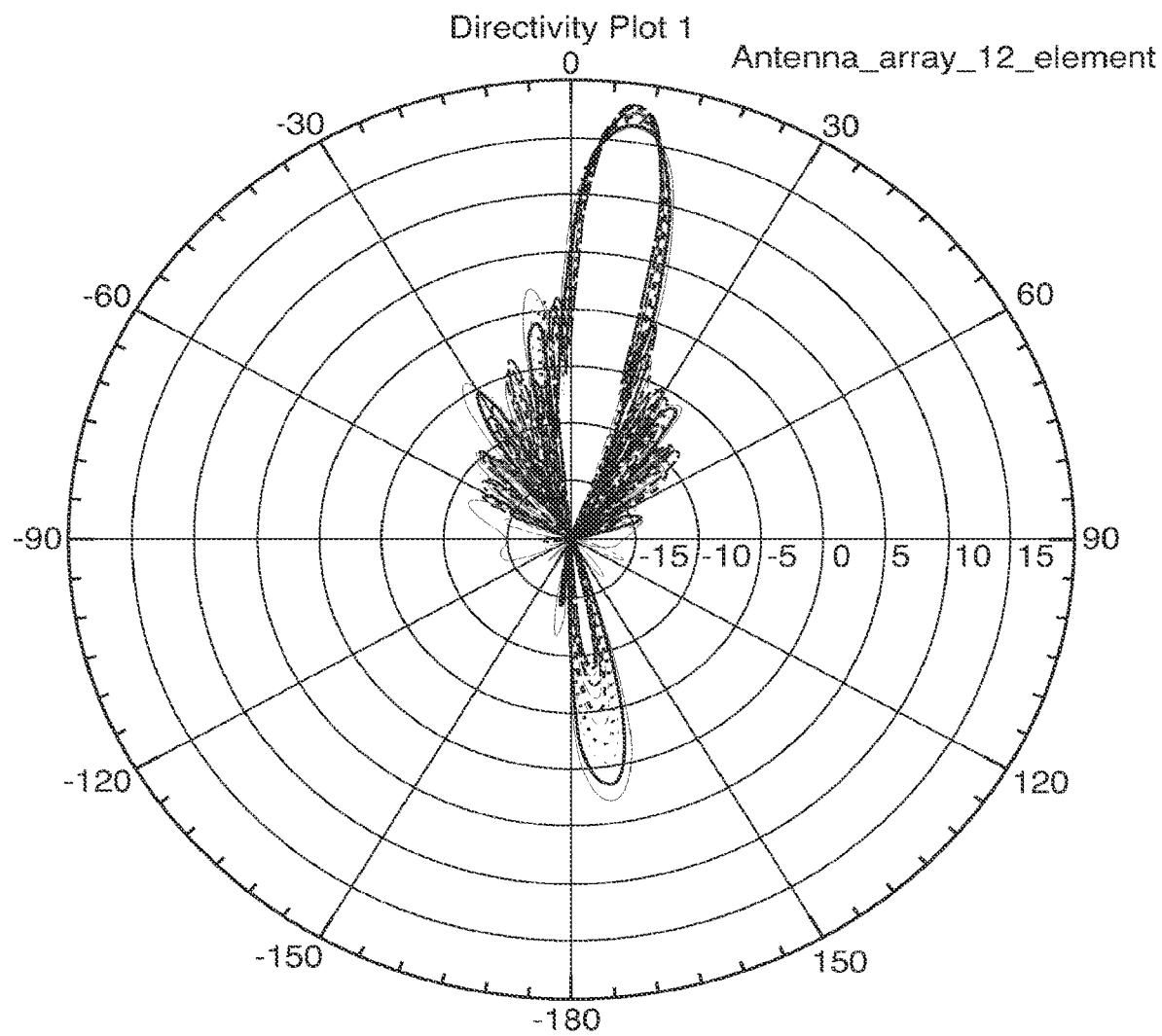
Figure 5A:
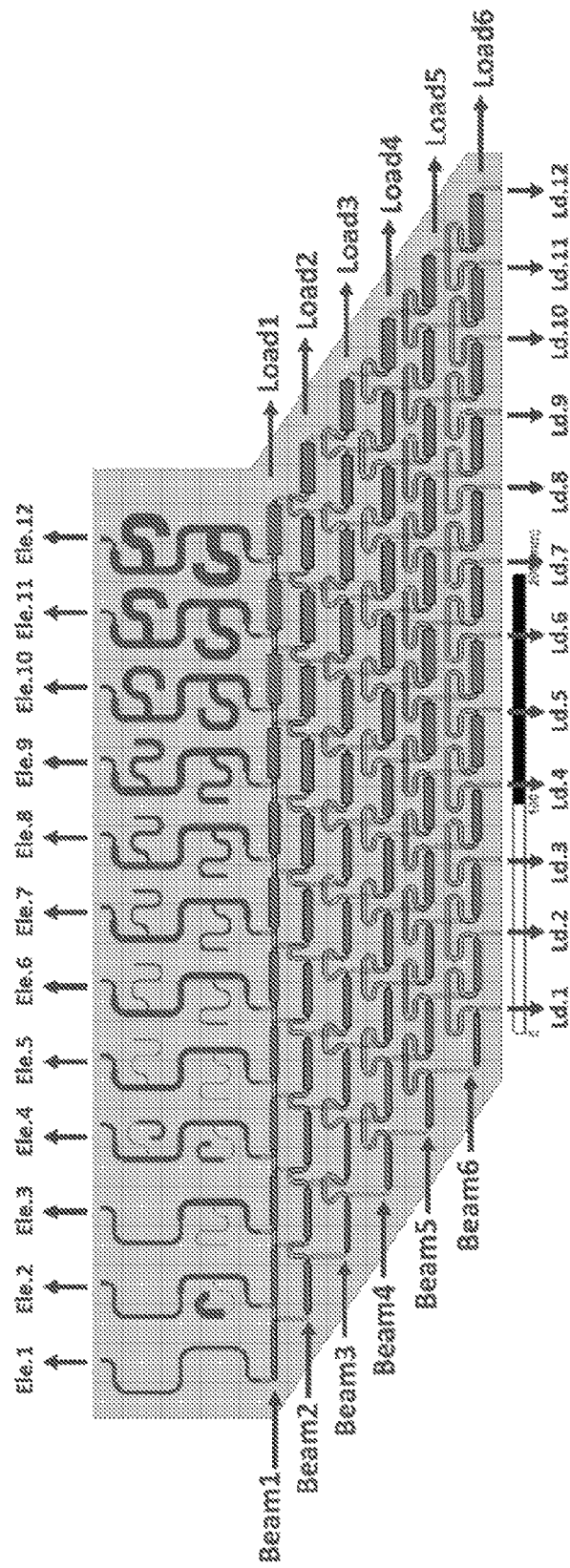
Figure 5B:
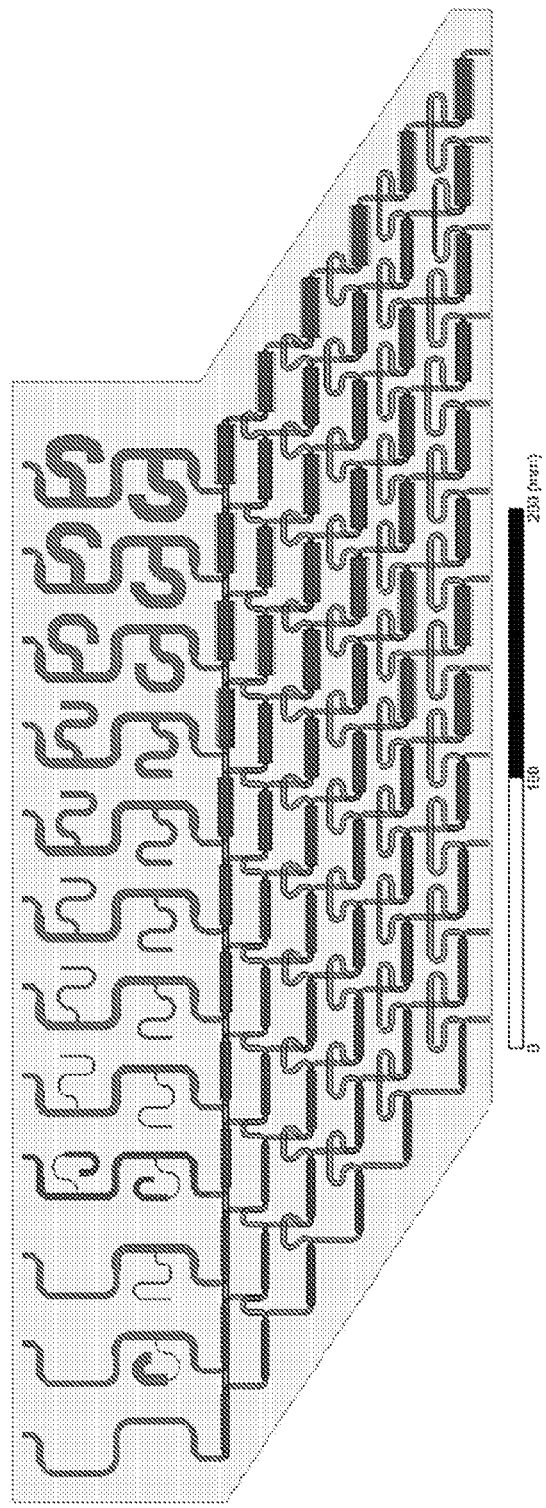
Figure 5C:
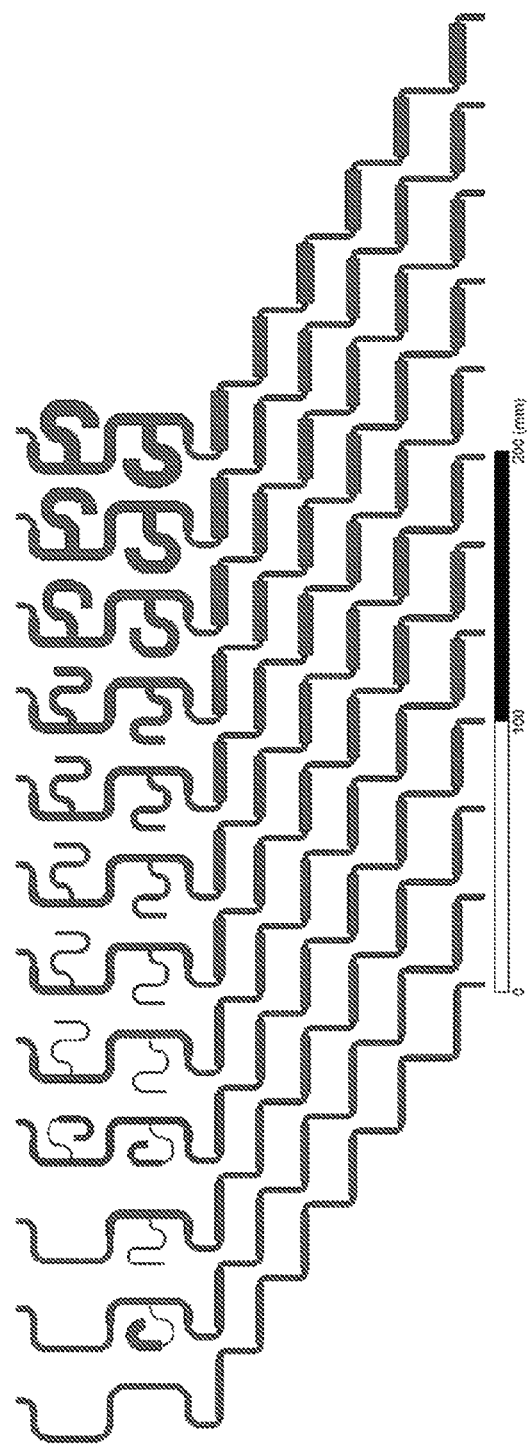
Figure 5E:
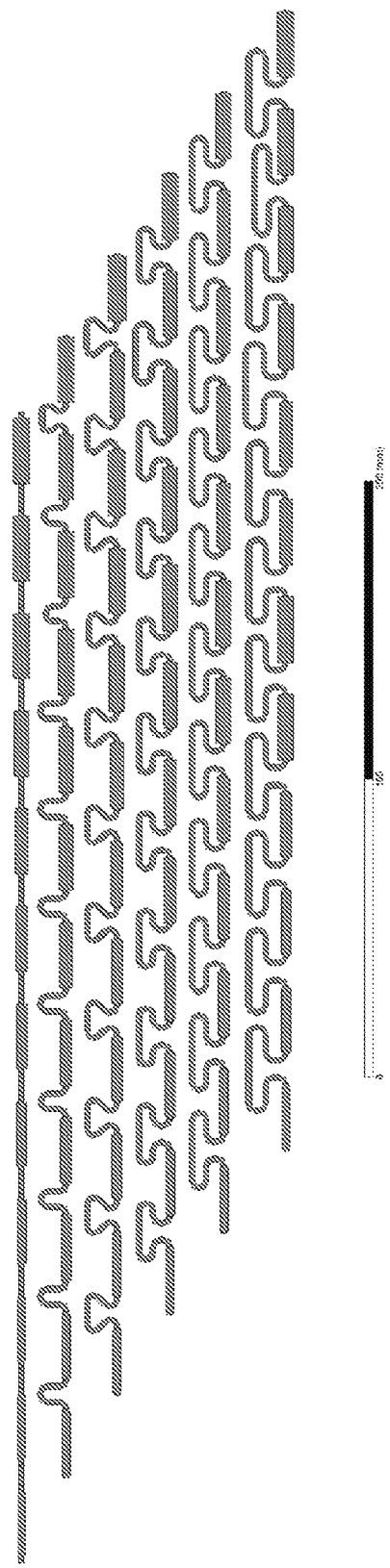
Figure 5F:
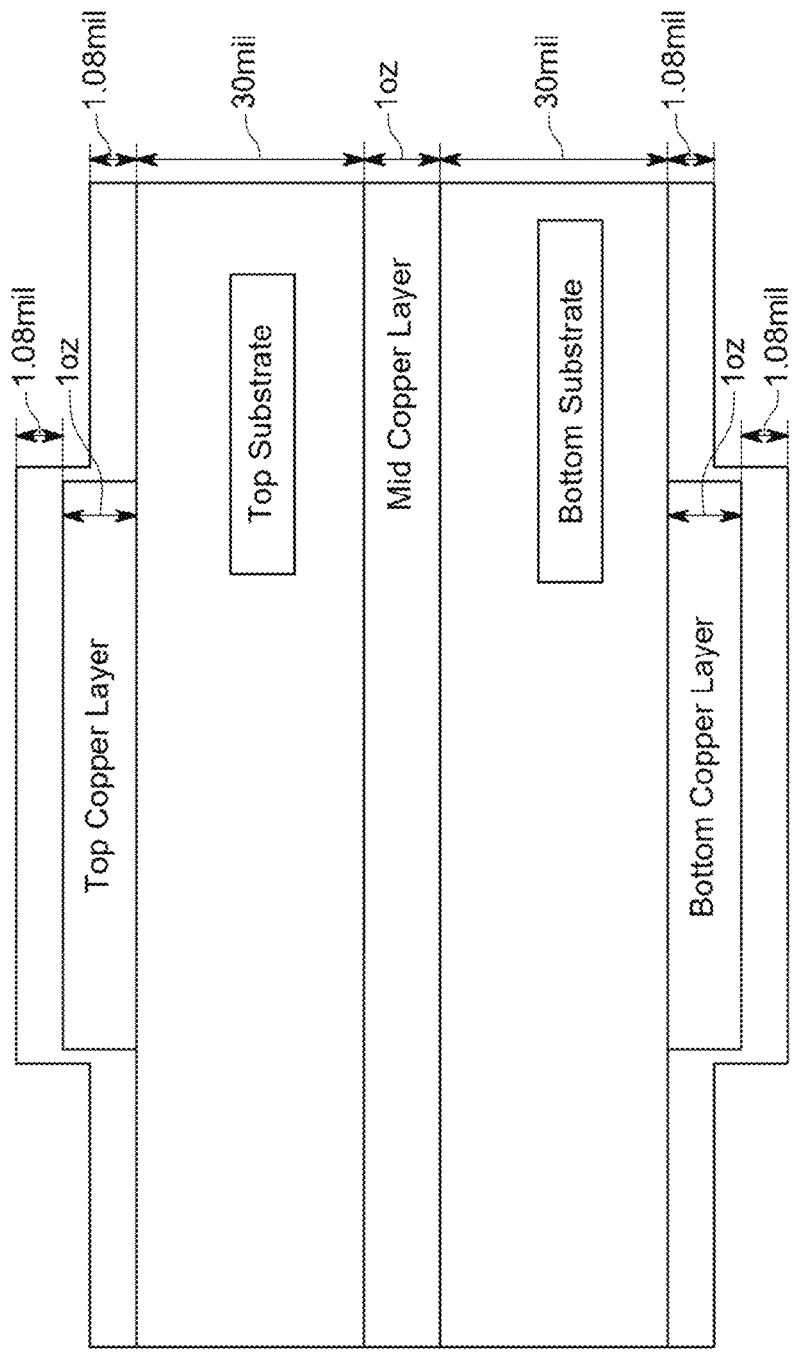

Referring to FIGS. 4A-4D, illustrated are the effects of eliminating or mitigating beam squint when compared to minimal or no mitigation of beam squint. In FIG. 4A and FIG. 4C, the radiation patterns of beam-2 and beam-3 generated by a 6-beam conventional Blass matrix are illustrated with the frequency changing from 1.7 GHz to 2.7 GHz. It can be seen that, without mitigation of beam squint effects, the beam directions will move with the frequency changing and that this leads to the reduction of the beam coverage overlap for whole frequency band. However, removing or mitigating beam squint will effectively suppress the movement of beam directions, as shown in FIG. 4B and FIG. 4D. FIG. 4A shows Beam-2 from a traditional Blass matrix. FIG. 4B shows Beam 2 from a system according to the present invention. FIG. 4C shows Beam 3 from a traditional Blass matrix while FIG. 4D shows Beam 3 from a system according to the present invention.

It should be clear that some intrinsic merits of a Blass matrix are inherited by one implementation of the present invention. As example, this implementation of the present invention is able to generate any number of beams for any number of elements. This is in contrast to a Butler matrix where number of beams must equal to the number of elements in the antenna array and where the number of beams and number of antenna array elements must be an integer power of two. Moreover, this implementation allows for the independent design and configuration of the direction, beam width, and sidelobe levels of each beam.

That being said, this implementation of the present invention differs from a Blass matrix in one important aspect. This implementation of the present invention is devised from many functional components such as couplers and phase shifters and is unlike a Blass matrix which is an indivisible whole. Accordingly, the implementation of the present invention can be separated into multiple circuits boards that are connected by cables. While the structural separation will not improve the beamforming performance, this will be very helpful in enhancing the flexibility and suitability of the design such that the overall design of the MBFN can be miniaturized.

In addition to the above advantages, in this implementation, each phase shifter in the phase-shifter group can be expanded into multi-sections or be constructed as having multiple sections or components. That means that there is, theoretically, no limitation as to the cancellation of beam squint if there is enough space to accommodate the phase-shifter group/multiple phase shifters. Also, each phase shifter has a good potential for wideband matching to meet other possible requirements.

The design and construction of an MBFN according to another aspect of the present invention may be divided into two discrete steps. The first step is to design a conventional Blass matrix according to the required number of beams and antenna array elements. Included in this step is the design of the Blass matrix such that the desired beam directions, beam widths, and sidelobe levels of each beam are taken into account. Once this is done, the second step is to design the phase-shifter group or multiple phase shifters to thereby cancel the beam squint. It should be clear that the phase shifters may be implemented using specifically configured phase shifters but that using electronically controllable switches with segments with specific lengths can result in programmable phase shifters.

A sample of a 12-element 6-beam MBFN without beam squint according to one aspect of the present invention is illustrated in FIG. 5. The overall configuration, positions of ports and loads, layouts of each layer, and the cross-section view of the example is shown in FIGS. 5A-5F. FIG. 5A shows the overall configuration of the system detailing the definitions of the beam ports, element ports, and loads. FIG. 5B is a top view of the copper layers for the system in one diagram. FIG. 5C is the top layer layout, FIG. 5D is the middle layer layout, and FIG. 5E is the bottom layer layout. FIG. 5F is a cross-sectional view of the circuit board for this system.

Figure 6:
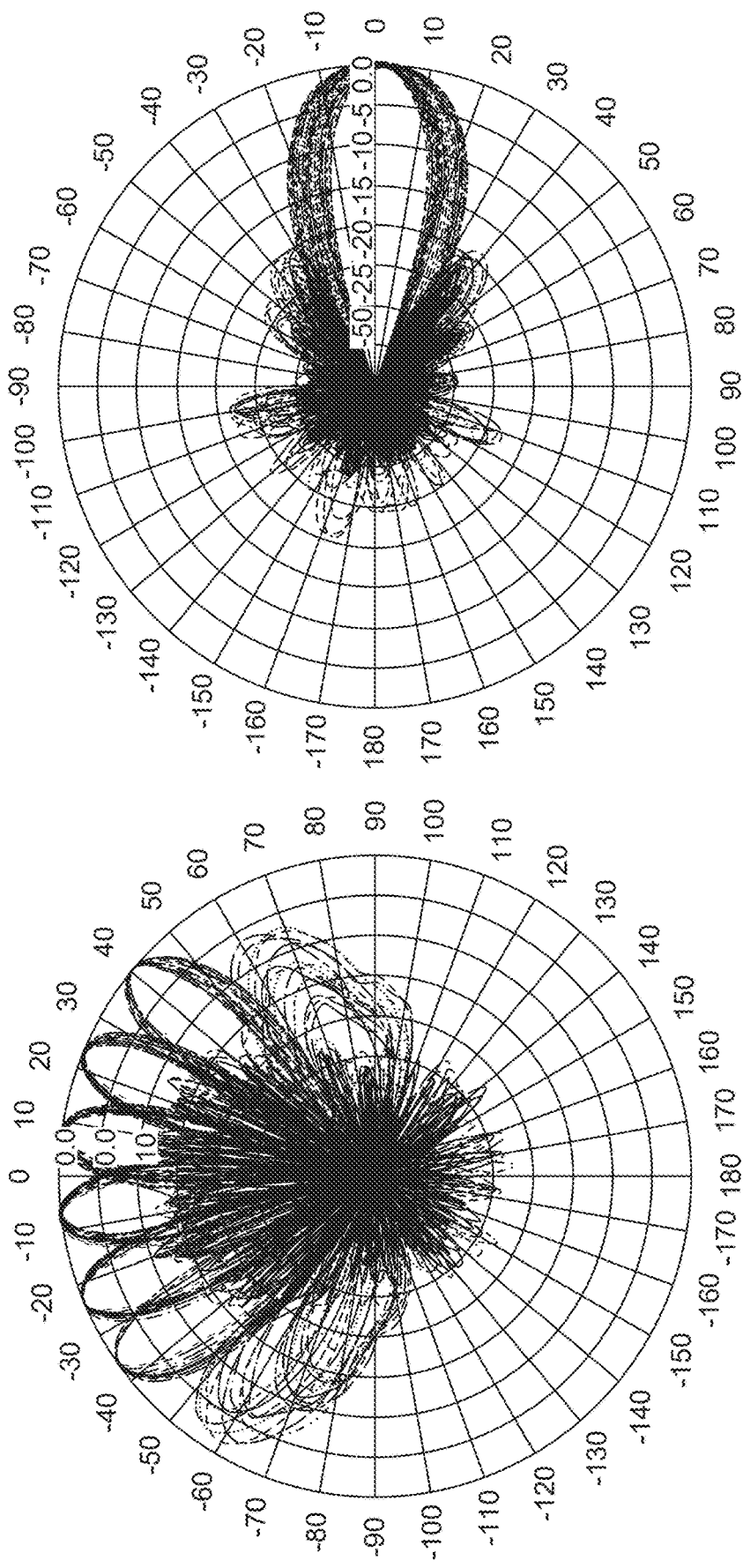
FIG. 6 shows measured radiation patterns resulting from the implementation illustrated in FIGS. 5A-5F.

From FIGS. 5A-5F, it can be seen that the matrix of couplers and the meander lines located in between the couplers form the Blass matrix. As well, it can be seen that the 12 bent lines with bent open-end stubs on the upper side of FIG. 5C form the phase-shifter group. In one implementation, this example configuration was operated within the frequency band of 1.695 GHz-2.69 GHz. Referring to FIG. 6, the measured radiation patterns for this example configuration are shown. The left radiation pattern in FIG. 6 is for the elevation plane while the right radiation pattern in FIG. 6 is for the azimuth plane. It can be seen that he central six beams illustrate a satisfying performance at beam stability within the frequency band.

While the configuration in FIGS. 5A-5F shows one possible implementation, this configuration only uses a single line or group of phase shifters. The configuration in FIGS. 5A-5F uses a single row of phase shifters and these phase shifters are placed outside the Blass matrix to cancel the beam squint. One variant would place multiple rows of phase shifters within the matrix. Such a variant is illustrated in FIG. 7.

Figure 7:
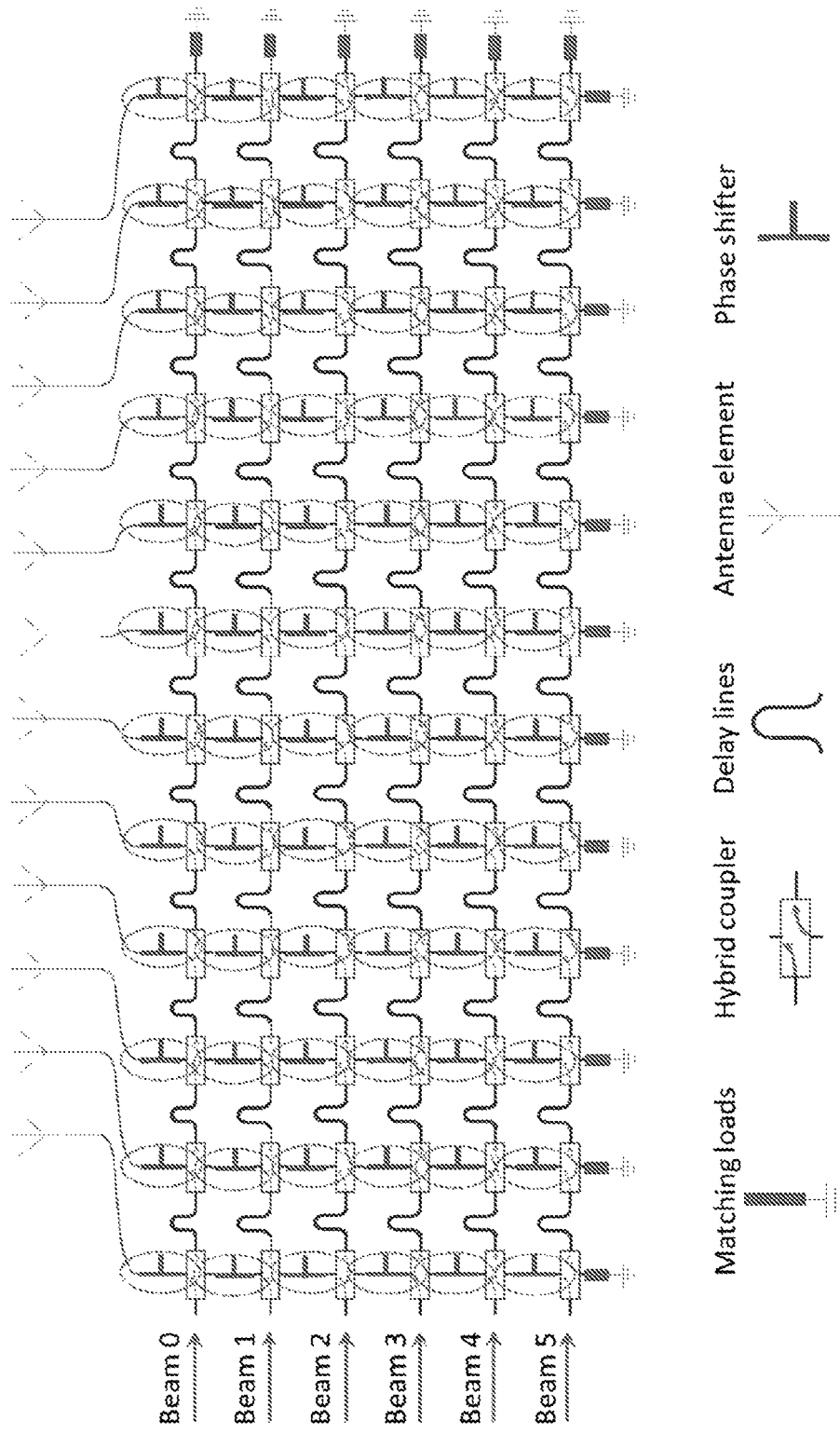
FIG. 7 schematically illustrates a variant of one aspect of the present invention.

As can be seen in FIG. 7, each row of hybrid couplers in the matrix circuit is sandwiched between rows of phase shifters. The bottom row of hybrid couplers is sandwiched between a row of matching loads and a row of phase shifters. Each hybrid coupler in the bottom row is therefore coupled between a phase shifter and a matching load. With the exception of these bottom row hybrid couplers, each hybrid coupler is coupled between two phase shifters. For the top row of phase shifters, each phase shifter is coupled between a hybrid coupler from the top row of hybrid couplers and an antenna array element. Theoretically, this configuration will exhibit better performance than the configuration in FIGS. 5A-5F.

In this variant, there are two groups of phase shifters—the first group is between the top row of hybrid couplers and the antenna elements while the second group is placed between adjacent rows of hybrid couplers in the matrix circuit. In the top row of hybrid couplers, each hybrid coupler is coupled column-wise between a phase shifter of the second group of phase shifters and a phase shifter of the first group of phase shifters. In the bottom row of this variant, the bottom row is coupled to matching loads such that each hybrid coupler in the bottom row is coupled column-wise between a matching load and a phase shifter.

The configuration of the phase shifters in this variant has each phase shifter of the second group of phase shifters being coupled between hybrid couplers of adjacent rows in the matrix circuit. This is configured such that each hybrid coupler is coupled in series column-wise to at least one phase shifter of said the second group of phase shifters. It should be clear that while such an implementation currently uses phase shifters with fixed parameters, programmable phase shifters (or phase shifters with changing parameters) are also possible.

A person understanding this invention may now conceive of alternative structures and embodiments or variations of the above all of which are intended to fall within the scope of the invention as defined in the claims that follow.

The invention claimed is:

1. A circuit for use in simultaneously generating multiple beams using an antenna array having multiple antenna array elements, the circuit comprising:
    a matrix circuit comprising a plurality of hybrid couplers and delay lines, said matrix circuit being coupled between a plurality of loads and said antenna array; and
    a plurality of phase shifters coupled between said matrix circuit and said antenna array,
    wherein
    each row of said matrix circuit comprises a plurality of hybrid couplers coupled in series row-wise, with each row-wise pair of hybrid couplers being joined by at least one delay line;
    each column of said matrix circuit comprises a plurality of hybrid couplers coupled in series column-wise;
    a top row of said matrix circuit is coupled to antenna elements of said antenna array such that each hybrid coupler of said top row is coupled to an antenna element of said antenna array by way of a phase shifter of said plurality of phase shifters, each hybrid coupler of said top row being coupled column-wise between a phase shifter of said plurality of phase shifters and a hybrid coupler of a preceding row of said matrix circuit;
    a bottom row of said matrix circuit is coupled to a plurality of matching loads such that each hybrid coupler of said bottom row is coupled column-wise between a matching load of said plurality of matching loads and a hybrid coupler of an immediately succeeding row of said matrix circuit; and
    said phase shifters are used to generate linearly increased phase differences between adjacent antenna array elements for signals from said matrix circuit.

2. The circuit according to claim 1, wherein a phase of a signal sent from a specific hybrid coupler to a specific antenna element in said antenna array is controlled by a specific phase shifter to which said specific hybrid coupler is coupled, said specific hybrid coupler being in said top row of said matrix circuit.

3. A circuit for use in simultaneously generating multiple beams using an antenna array having multiple antenna array elements, the circuit comprising:
    a matrix circuit comprising a plurality of hybrid couplers and delay lines, said matrix circuit being coupled between a plurality of loads and said antenna array;
    a first plurality of phase shifters coupled between adjacent rows of said matrix circuit; and
    a second plurality of phase shifters coupled between said matrix circuit and said antenna array,
    wherein
    each row of said matrix circuit comprises a plurality of hybrid couplers coupled in series row-wise, with each row-wise pair of hybrid couplers being joined by at least one delay line;
    a top row of said matrix circuit is coupled to antenna elements of said antenna array such that each hybrid coupler of said top row is coupled to an antenna element of said antenna array by way of a phase shifter of said second plurality of phase shifters, each hybrid coupler of said top row being coupled column-wise between a phase shifter of said second plurality of phase shifters and a phase shifter of said first plurality of phase shifters;
    a bottom row of said matrix circuit is coupled to a plurality of matching loads such that each hybrid coupler of said bottom row is coupled column-wise between a matching load of said plurality of matching loads and a phase shifter of said first plurality of phase shifters;

each phase shifter of said first plurality of phase shifters is coupled between hybrid couplers of adjacent rows in said matrix circuit such that each hybrid coupler of said matrix circuit is coupled in series column-wise to at least one phase shifter of said first plurality of phase shifters; and said phase shifters of said first and second plurality of phase shifters are used to generate linearly increased phase differences between adjacent antenna array elements for signals from said matrix circuit.

4. The circuit according to claim 3, wherein a phase of a signal sent from a specific hybrid coupler to a specific antenna element in said antenna array is at least partially controlled by a specific phase shifter in said second plurality of phase shifters, said specific phase shifter being a phase shifter to which said specific hybrid coupler is coupled, said specific hybrid coupler being in said top row of said matrix circuit.

5. A circuit for use in simultaneously generating multiple beams using an antenna array having multiple antenna array elements, the circuit comprising:
- a matrix circuit comprising a plurality of hybrid couplers and delay lines, said matrix circuit being coupled between a plurality of loads and said antenna array; and
- a plurality of phase shifters with each phase shifter being coupled to at least one hybrid coupler, wherein
- each row of said matrix circuit comprises a plurality of hybrid couplers coupled in series row-wise, with each row-wise pair of hybrid couplers being joined by at least one delay line;
- a bottom row of said matrix circuit is coupled to a plurality of matching loads;
- said phase shifters are used to generate linearly increased phase differences between adjacent antenna array elements for signals from said matrix circuit; and
- a top row of said matrix circuit is coupled to antenna elements of said antenna array such that each hybrid coupler of said top row is coupled to an antenna element of said antenna array by way of a phase shifter of said plurality of phase shifters, each hybrid coupler of said top row being coupled column-wise between a phase shifter of said plurality of phase shifters and a hybrid coupler of a preceding row of said matrix circuit.

6. The circuit according to claim 5, wherein each column of said matrix circuit comprises a plurality of hybrid couplers coupled in series column-wise to at least one phase shifter or at least one hybrid coupler.

* * * * *